(12) United States Patent
Nakagoshi

(10) Patent No.: US 11,381,790 B2
(45) Date of Patent: Jul. 5, 2022

(54) DISPLAY SYSTEM, VIDEO PROCESSING DEVICE, PIXEL SHIFT DISPLAY DEVICE, VIDEO PROCESSING METHOD, DISPLAY METHOD, AND PROGRAM

(71) Applicant: JVCKENWOOD Corporation, Yokohama (JP)

(72) Inventor: Ryosuke Nakagoshi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 4 days.

(21) Appl. No.: 16/714,458

(22) Filed: Dec. 13, 2019

(65) Prior Publication Data

US 2020/0120316 A1   Apr. 16, 2020

Related U.S. Application Data

(63) Continuation of application No. PCT/JP2018/007244, filed on Feb. 27, 2018.

(30) Foreign Application Priority Data

Jun. 16, 2017   (JP) .............................. JP2017-118954

(51) Int. Cl.
*H04N 9/31*   (2006.01)
*H04N 9/04*   (2006.01)
(Continued)

(52) U.S. Cl.
CPC ......... *H04N 9/3114* (2013.01); *G03B 21/006* (2013.01); *G09G 3/007* (2013.01); *G09G 3/3648* (2013.01); *H04N 9/0451* (2018.08)

(58) Field of Classification Search
CPC .......... G09G 3/003; G09G 3/007; G09G 3/20; G09G 3/36; G09G 3/3648; G09G 3/2022;
(Continued)

(56) References Cited

U.S. PATENT DOCUMENTS

2008/0284763 A1   11/2008 Someya et al.
2009/0244048 A1*  10/2009 Yamanaka ......... H04N 5/23293
                                                          345/212
(Continued)

FOREIGN PATENT DOCUMENTS

JP    2012-093479 A    5/2012
JP    2013-090109 A    5/2013
(Continued)

*Primary Examiner* — Christopher E Leiby
(74) *Attorney, Agent, or Firm* — Procopio, Cory, Hargreaves & Savitch LLP

(57) ABSTRACT

A video processing device according to an embodiment includes: a determination unit configured to determine whether pixel shift display is performed according to an original video; a control signal generation unit configured to generate a control signal indicating ON/OFF of the pixel shift display and a pixel display position when the pixel shift display is turned ON, based on a determination result by the determination unit; a display image generation unit configured to generate a display image from the original video, based on the determination result by the determination unit; and an addition unit configured to add the control signal to the display image.

13 Claims, 9 Drawing Sheets

(51) Int. Cl.
*G03B 21/00* (2006.01)
*G09G 3/00* (2006.01)
*G09G 3/36* (2006.01)

(58) Field of Classification Search
CPC .. G09G 3/2059; G09G 5/005; G09G 2380/12; G09G 2380/10; G09G 2340/0428; G09G 2340/0435; G09G 2320/106; G09G 2370/12; G09G 2370/04; G03B 21/006; G03B 21/00; G03B 21/14; H04N 9/3114; H04N 9/0451; H04N 5/74; G02F 1/13; G02F 1/133
See application file for complete search history.

(56) References Cited

U.S. PATENT DOCUMENTS

| | | | | |
|---|---|---|---|---|
| 2012/0075438 A1* | 3/2012 | Kikkawa | ............. | H04N 21/431 348/54 |
| 2013/0097631 A1* | 4/2013 | Ikeda | ............. | H04N 21/80 725/32 |
| 2013/0215326 A1* | 8/2013 | Sato | ............. | G09G 3/3648 348/453 |
| 2015/0043653 A1* | 2/2015 | Ying | ............. | H04N 19/103 375/240.23 |
| 2017/0053450 A1* | 2/2017 | Rodriguez | ............. | H04N 13/398 |
| 2018/0146179 A1* | 5/2018 | Ohno | ............. | G03B 21/145 |
| 2018/0210327 A1* | 7/2018 | Miyagi | ............. | H04N 9/3188 |

FOREIGN PATENT DOCUMENTS

| | | |
|---|---|---|
| JP | 5538093 B2 | 7/2014 |
| JP | 2015-87631 A | 5/2015 |
| JP | 5772091 B2 | 9/2015 |
| JP | 2015-176019 A | 10/2015 |
| JP | 2015-194596 A | 11/2015 |
| WO | 2010/140430 A1 | 12/2010 |

\* cited by examiner

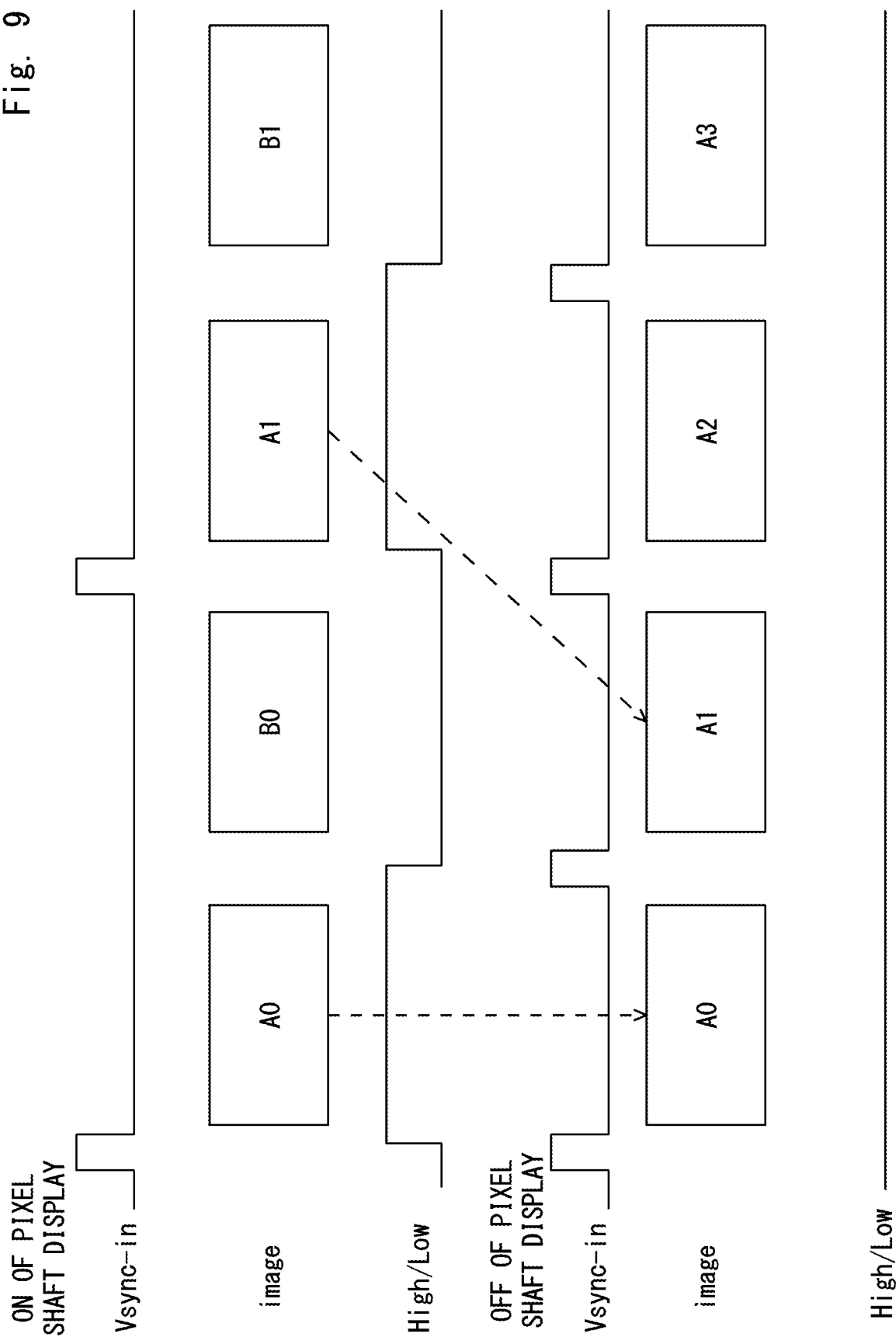

DISPLAY SYSTEM, VIDEO PROCESSING DEVICE, PIXEL SHIFT DISPLAY DEVICE, VIDEO PROCESSING METHOD, DISPLAY METHOD, AND PROGRAM

CROSS REFERENCE TO RELATED APPLICATION

This application is a Bypass Continuation of PCT/JP2018/007244 filed on Feb. 27, 2018, which is based upon and claims the benefit of priority from Japanese patent application No. 2017-118954 filed on Jun. 16, 2017 the disclosure of which is incorporated herein in its entirety by reference.

BACKGROUND

The present invention relates to a display system, a video processing device, a pixel shift display device, a video processing method, a display method, and a program.

Patent Literature 1 (Japanese Patent No. 5538093) discloses an image display device including an optical path changing unit that shifts display positions of RGB pixels. The optical path changing unit includes a transmission-type liquid crystal display element of each color of RGB and a piezoelectric actuator. The optical path changing unit performs pixel shifting of 0.5 pixel pitches on display positions in the vertical direction and the horizontal direction according to a frame period. Thus, a frame of which a displacement is 0 and a frame of which a displacement is 0.5 pixels are alternately repeated.

Patent Literature 2 (Japanese Patent No. 5772091) discloses a pixel shift display device that includes a liquid display element, a first polarization conversion element, and a birefringent element. The pixel shift display device in Patent Literature 2 generates two sub-frame images, a sub-frame image not subjected to pixel shifting and a sub-frame image subjected to pixel shifting within a display period of one original image from an image (original image) of one frame.

Then, the liquid crystal display element polarizes and modulates light according to intensity of a display image. The first polarization conversion element does not rotate a polarization direction of image display light in the case of the sub-frame image not subjected to the pixel shifting and rotates the polarization direction by 90° in the case of the sub-frame image subjected to the pixel shifting. Then, image display light from the first polarization conversion element is refracted by the birefringent element. The birefringent element is an optical element formed of a crystal in which birefringence occurs and shifts an optical path in the polarization direction. Accordingly, the sub-frame image not subjected to pixel shifting and the sub-frame image subjected to pixel shifting are alternately displayed.

SUMMARY

By performing such pixel shift display, it is possible to increase a display resolution. Since one image is displayed using signals corresponding to a plurality of frames, the pixel shift display is appropriate for an image with a slow motion or a still image. However, in the pixel shift display, a frame rate is lower than a frame rate when the pixel shifting is not performed. Thus, there is a possibility of image quality deterioration such as blurring occurring in an image with a fast motion.

An embodiment is devised in view of the foregoing circumstances and it is an object of the present invention to provide a display system, a video processing device, a pixel shift display device, a video processing method, a display method, and a program capable of appropriately performing display according to a scene.

A display system according to an aspect of an embodiment includes a video processing device configured to generate a display video signal based on an original video and a pixel shift display device configured to perform pixel shift display based on the display video signal. The video processing device includes: a determination unit configured to determine whether the pixel shift display is performed according to the original video; a control signal generation unit configured to generate a control signal indicating ON/OFF of the pixel shift display and a pixel display position when the pixel shift display is turned ON, based on a determination result by the determination unit; a display image generation unit configured to generate a display image from the original video, based on the determination result by the determination unit; and an addition unit configured to generate the display video signal by adding the control signal to the display image. The pixel shift display device includes: a spatial modulator configured to modulate and emit light based on pixel data of the display image included in the display video signal; a projection optical system configured to project light from the spatial modulator; an optical path changing unit configured to shift an optical path of light from the spatial modulator according to the control signal included in the display video signal so that a projection position by the projection optical system is switched at a predetermined period in order to perform the pixel shift display on a video to be projected by the projection optical system; and a switching unit configured to switch between ON and OFF of the pixel shift display based on the control signal included in the display video signal.

A video processing device according to an aspect of an embodiment includes: a determination unit configured to determine whether pixel shift display is performed according to an original video; a control signal generation unit configured to generate a control signal indicating ON/OFF of the pixel shift display and a pixel display position when the pixel shift display is turned ON, based on a determination result by the determination unit; a display image generation unit configured to generate a display image from the original video, based on the determination result by the determination unit; and an addition unit configured to generate the display video signal by adding the control signal to the display image.

A pixel shift display device according to an aspect of an embodiment includes: a spatial modulator configured to modulate and emit light based on pixel data of a display image included in a display video signal; a projection optical system configured to project light from the spatial modulator; an optical path changing unit configured to shift an optical path of light from the spatial modulator according to a control signal included in the display video signal so that a projection position by the projection optical system is switched at a predetermined period in order to perform the pixel shift display on a video to be projected by the projection optical system; and a switching unit configured to switch between ON and OFF of the pixel shift display based on the control signal included in the display video signal.

A video processing method according to an aspect of an embodiment includes: a step of determining whether pixel shift display is performed according to an original video; a step of generating a control signal indicating ON/OFF of the pixel shift display and a pixel display position when the pixel shift display is turned ON, based on a determination result; a step of generating a display image from the original video, based on the determination result; and a step of generating a display video signal by adding the control signal to the display image.

A display method according to an aspect of an embodiment includes: a step of modulating and emitting light based on pixel data of a display image included in a display video signal by a spatial modulator; a step of projecting light from the spatial modulator by a projection optical system; a step of shifting an optical path of light from the spatial modulator according to a control signal included in the display video signal so that a projection position by the projection optical system is switched at a predetermined period in order to perform pixel shift display on a video to be projected; and a step of switching between ON and OFF of the pixel shift display based on the control signal included in the display video signal.

A program according to an aspect of an embodiment causes a computer to perform: a step of determining whether pixel shift display is performed according to an original video; a step of generating a control signal indicating ON/OFF of the pixel shift display and a pixel display position when the pixel shift display is turned ON, based on a determination result; a step of generating a display image from the original video, based on the determination result; and a step of generating a display video signal by adding the control signal to the display image.

According to the embodiment, it is possible to provide the display system, the video processing device, the pixel shift display device, the video processing method, the display method, and the program capable of appropriately performing display according to a scene.

BRIEF DESCRIPTION OF THE DRAWINGS

FIG. 9 is a timing chart illustrating a process at the time of ON and OFF of the pixel shift display.

DETAILED DESCRIPTION

<Display System>

A display system according to an embodiment is a display system that displays a video. The video displayed by the display system may be a camera video acquired by a camera or may be a computer graphics video (CG video) generated by a computer. The display system displaying a CG video is, for example, a flight simulator or a drive simulator.

Figure 1:
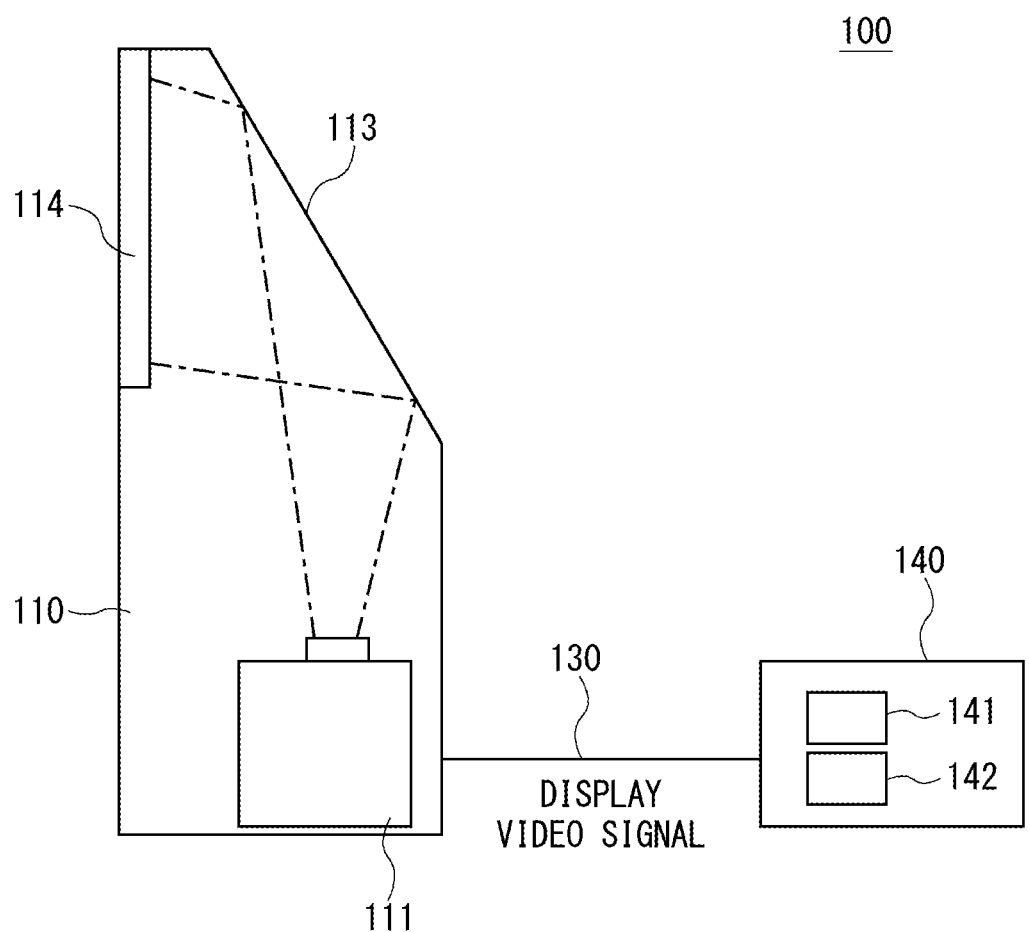
FIG. 1 is a diagram illustrating an overall configuration of a display system.

FIG. 1 illustrates an overall configuration of a display system. A display system 100 includes a projector 110, an interface unit 130, and a video processing device 140.

The projector 110 displays a video of a moving image or a still image. The projector 110 can switch between ON and OFF of pixel shift display (which is also referred to as wobbling) to display a video. At the time of turning on the pixel shift display, the projector 110 shift a display position by 0.5 pixel pitches for each sub-frame. Specifically, the projector 110 alternately displays a sub-frame image A and a sub-frame image B shifted by 0.5 pixel pitches from the display position of the sub-frame image A. On the other hand, at the time of turning off the pixel shift display, a video is projected to the same normal position. At the time of turning on the pixel shift display, display can be performed at a higher resolution than at the time of turning off the pixel shift display.

The projector 110 is, for example, a rear projection-type projector (rear projector). In the embodiment, a display is assumed to be the rear projection-type projector 110 in the description, but may be a reflection-type projector. Alternatively, another display (display device) such as a plasma display, a liquid crystal display, or an organic light-emitting diode display may be used as the display. The display may be a pixel shift display device capable of performing pixel shift display.

The projector 110 includes a projection unit 111, a mirror 113, and a screen 114. The projection unit 111 generates projection light based on a display video signal to project a video to the screen 114. The projection light from the projection unit 111 is reflected in the direction of the screen 114 from a mirror 113. The screen 114 is a projection surface to which a video of the projector 110 is projected. A display video from the projection unit 111 is expanded and projected to the screen 114 by a projection lens or the like. A configuration of the projection unit 111 will be described later.

The video processing device 140 generates a display video signal for performing pixel shift display based on an original video. When the video processing device 140 is an image generator (IG) generating a CG video, the video processing device 140 generates an original video based on information regarding a light source, an object, or the like. The original video may be a camera image acquired by a high-resolution camera such as a 8K-compliant camera.

For example, the video processing device 140 is a personal computer (PC) that includes a central processing unit (CPU), a memory, a graphic card, a keyboard, a mouse, and an input/output port (input/output I/F). The input/output port regarding video input and output is, for example, an HDMI (registered trademark), a DisplayPort, a DVI, an SDI, or the like.

The video processing device 140 includes a processor 141 and a memory 142 to generate a display video signal. In FIG. 1, one processor 141 and one memory 142 are illustrated, but a plurality of processors 141 and a plurality of memories 142 may be provided. The details of a process in the video processing device 140 will be described later.

When the pixel shift display is turned on, the video processing device 140 generates two sub-frame images A and B based on an image of one frame of the original video (hereinafter referred to as an original image). Pixel display positions of the sub-frame image A and the sub-frame image B are shifted. That is, on the screen 114, the sub-frame image A is projected to a first pixel display position and the sub-frame image B is projected to a second pixel display position. The video processing device 140 generates a display video signal so that the sub-frame image A and the sub-frame image B are alternately displayed.

For example, when the original video has a resolution of 8K (7680×4320), the sub-frame images A and B each have a resolution of 4K (3840×2160). When a frame rate (refresh rate) of the original video is 60 Hz, the sub-frame image A and the sub-frame image B are switched at 120 Hz.

The memory 142 stores therein a computer program for performing image processing. Then, the processor 141 reads a program from the memory 142 and executes the program. In this way, the video processing device 140 generates a display video signal from the original image. The display video signal includes pixel data corresponding to gradation value of each pixel. The pixel data of the display video signal is RGB data of each pixel.

The interface unit 130 has an interface between the video processing device 140 and the projector 110. That is, a signal is transmitted between the video processing device 140 and the projector 110 via the interface unit 130. Specifically, the interface unit 130 includes an audio visual (AV) cable connecting an output port of the video processing device 140 and an input port of the projector 110. As the interface unit 130, a general-purpose I/F such as an HDMI, a DisplayPort, a DVI, or an SDI can be used, as described above. The interface unit 130 is an interface capable of inputting and outputting a video with a 4K resolution.

<Image Shift Display>

Figure 2:
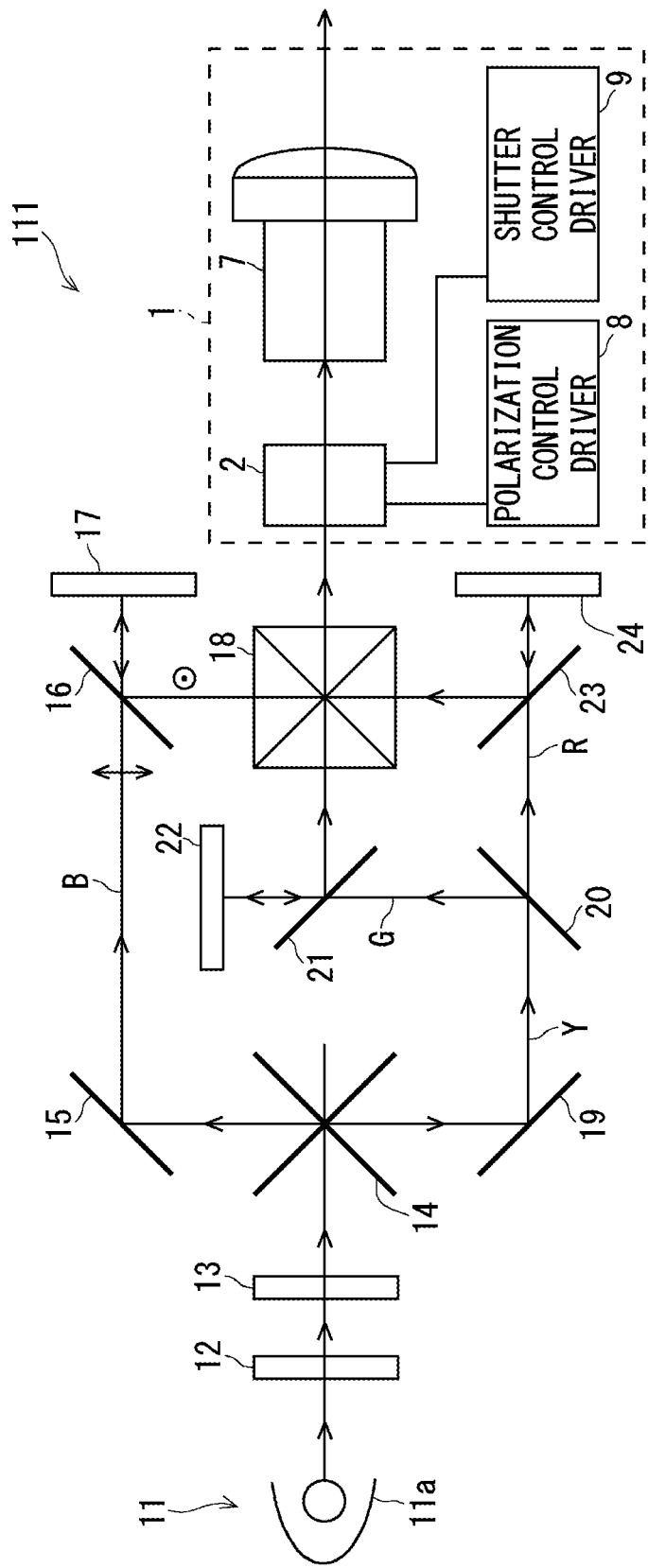
FIG. 2 is a diagram illustrating a configuration of a display device performing pixel shift display.
Figure 3:
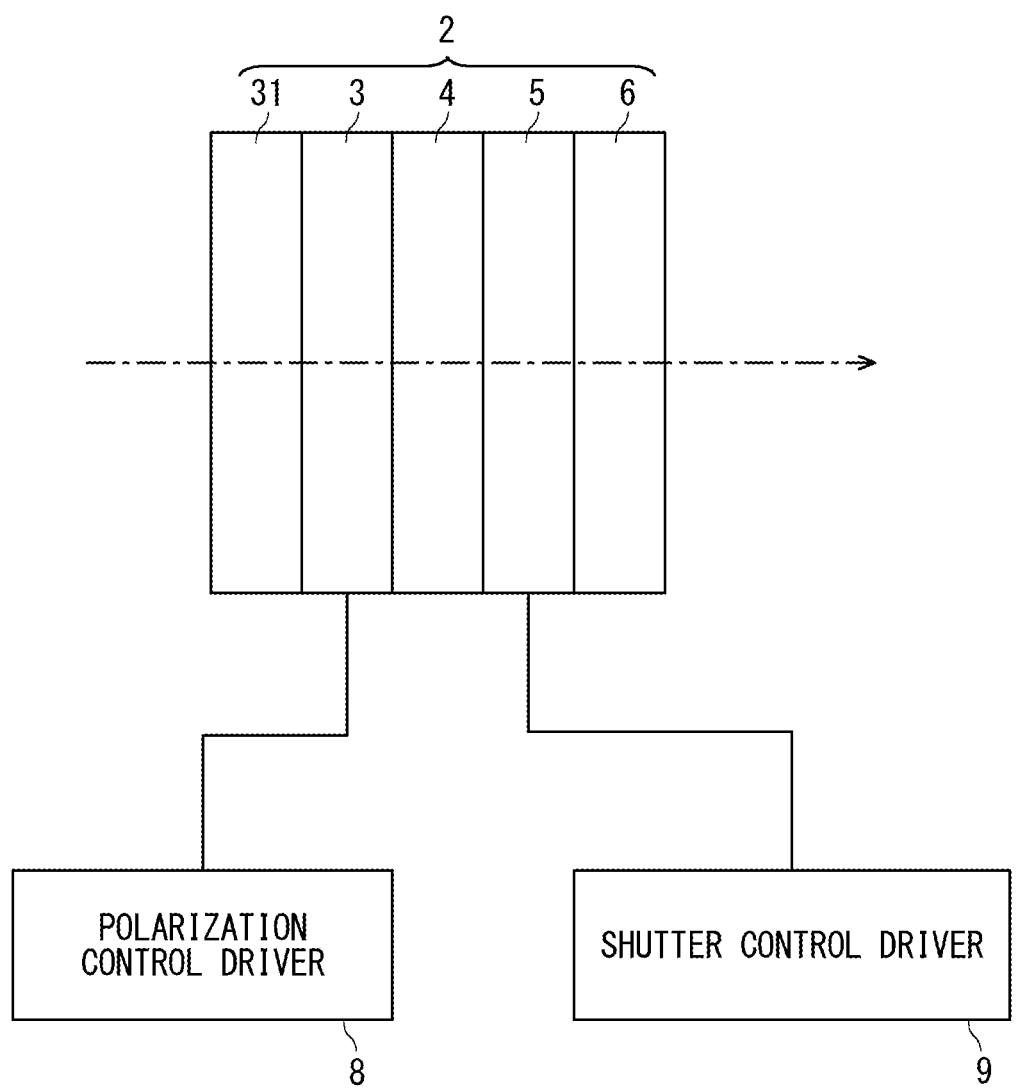
FIG. 3 is a diagram illustrating a schematic configuration of the display device performing pixel shift display.
Figure 4:
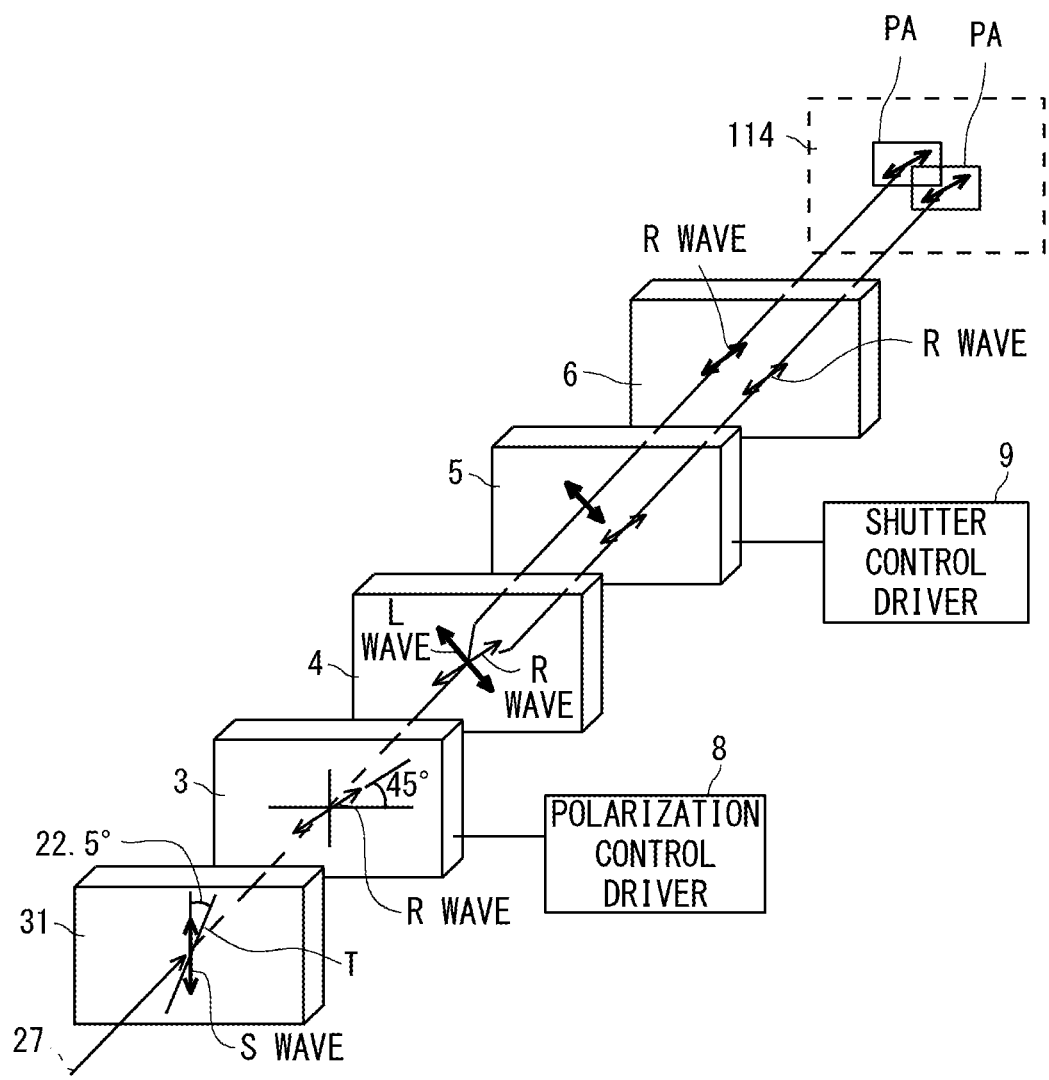
FIG. 4 is a diagram illustrating an operation of the pixel shift display.
Figure 5:
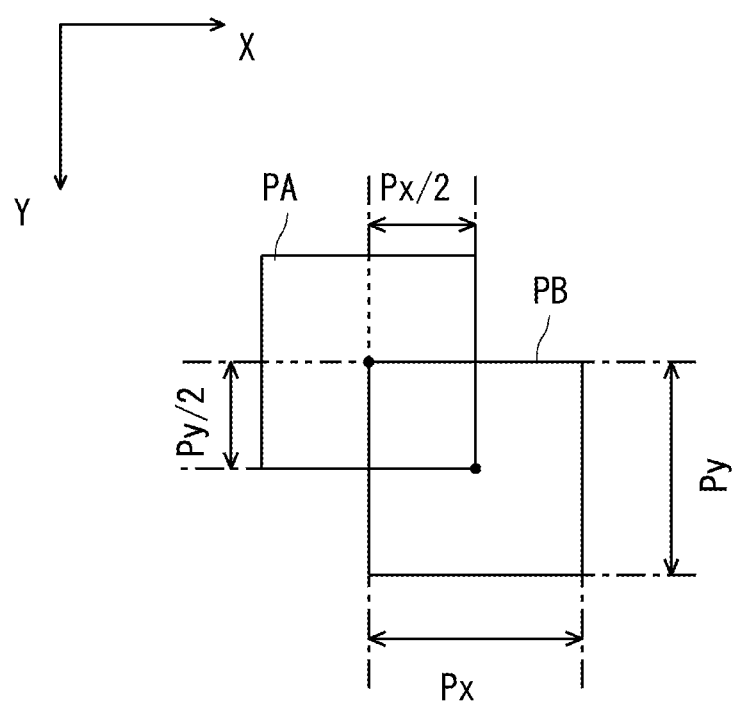
FIG. 5 is a diagram illustrating a pixel display position by the pixel shift display.

Next, pixel shift display in the projector 110 will be described with reference to FIGS. 2 to 5. FIG. 2 is a schematic diagram illustrating an optical system in the projector 110. FIG. 3 is a diagram illustrating a configuration of an optical path changing unit 2 provided in a pixel shift display unit 1. FIG. 4 is a diagram illustrating an optical path in the optical path changing unit 2. FIG. 5 is a diagram illustrating a pixel display position in the pixel shift display. In the embodiment, a configuration in which pixel shift display is performed using a birefringent element is used as in Patent Literature 2. For the details of the pixel shift display, the same configuration and method as those of Patent Literature 2 can be used. Therefore, detailed description will not be repeated.

First, the projection unit 111 which is an optical system of the projector 110 will be described with reference to FIG. 2. The projection unit 111 includes the pixel shift display unit 1. The pixel shift display unit 1 is provided on an optical exit side of a color combination prism (cross dichroic prism) 18 that emits three pieces of red, green, and blue light incident from separate optical paths toward one optical path.

As illustrated in FIG. 2, the projection unit 111 includes a light source 11, and an integrator 12 and a polarized-light combination element 13 provided on a side on which light from the light source 11 travels.

A high-pressure mercury lamp, a metal halide lamp, or the like is used as the light source 11. White light emitted from the light source 11 is reflected by a reflector 11a that has a rectilinear or paraboloid of revolution and is incident as substantially parallel light on the integrator 12.

The integrator 12 spatially uniformizes intensity of the incident white light. The polarized-light combination element 13 is an optical element that includes a plurality of polarized beam splitters arranged in parallel in a strip form and configured in a flat shape and a phase difference plate, and aligns polarization directions of incident light polarized at random in a constant polarization direction and emits the light. In the embodiment, the polarized-light combination element 13 converts incident light polarized at random into a P wave. As another form, the polarized-light combination element 13 may align the incident light to an S wave and subsequently convert the S wave into a P wave using a rotator (not illustrated).

The projection unit 111 further includes a cross dichroic mirror 14. The cross dichroic mirror 14 separates white light from the polarized-light combination element 13 into light B containing a blue component and light Y containing a yellow component and causes the pieces of light to be emitted along separate optical paths.

The blue light B passing through the cross dichroic mirror 14 is reflected by the dichroic mirror 15 and then is incident on a wire grid 16 serving as a polarized beam splitter (PBS). The dichroic mirror 15 may be a known mirror formed of an aluminum deposition film or the like. The wire grid 16 transmits the P wave and reflects the S wave. Since the light B from the cross dichroic mirror 14 is a P wave, the light B is transmitted through the wire grid 16 and is incident on a blue liquid crystal display element 17. The blue liquid crystal display element 17 reflects the incident light B toward the wire grid 16 while modulating a polarized component (that is, a P wave component) of the incident light B into the S wave according to the intensity of the blue component of a display image. For the light reflected from the blue liquid crystal display element 17, only the S wave component is reflected by the wire grid 16 and the light is incident on the color combination prism 18.

On the other hand, the yellow light Y passing through the cross dichroic mirror 14 is incident on a dichroic mirror 20 via the dichroic mirror 19. The dichroic mirror 19 may be a known mirror formed of an aluminum deposition film or the like.

In the dichroic mirror 20, the yellow light Y is separated into green light G and red light R, the green light G is reflected, and the red light R is transmitted. On light paths of the light G and the light R thereafter, as illustrated in FIG. 1, a green liquid crystal display element 22 and a wire grid 21 serving as a PBS, and a red liquid crystal display element 24 and a wire grid 23 serving as a PBS are provided respectively. The function is the same as that of the blue liquid crystal display element 17 and the wire grid 16 used for the light B. Accordingly, only the S wave component obtained through polarization modulation by the green liquid crystal display element 22 in the green light G is incident on the color combination prism 18. Only the S wave component obtained through polarization modulation by the red liquid crystal display element 24 in the red light R is incident on the color combination prism 18.

The selection and disposition of each optical element to the color combination prism 18 are not limited to FIG. 1 and can be appropriately modified. The liquid crystal display elements 17, 22, and 24 are, for example, liquid crystal on silicon (LCOS) panels and a plurality of pixels are arranged in an array form. The liquid crystal display elements 17, 22, and 24 are spatial modulators that modulate and emit light based on pixel data. Each pixel of the liquid crystal display elements 17, 22, and 24 performs gradation display with a predetermined number of bits. For example, each of the liquid crystal display elements 17, 22, and 24 has a resolution of 4K. Any of the liquid crystal display elements 17, 22, and 24 are not limited to a reflection type, but may be of a transmission type.

The color combination prism 18 combines the light B, the light G, and the light R incident from each lateral surface and a rear surface and emit the light from the front surface. The light emitted from the color combination prism 18 is incident on a projection lens 7 serving as a projection optical system via the optical path changing unit 2 of the pixel shift display unit 1. The projection lens 7 projects incident illumination light toward the screen 114 (see FIG. 1) and forms an image to perform image display. Thus, the projection unit 111 can project a color image to the screen 114.

The pixel shift display unit 1 includes the optical path changing unit 2 which is an optical element assembly, the projection lens 7, a polarization control driver 8, and a shutter control driver 9.

As illustrated in FIG. 3, the optical path changing unit 2 includes a half-wavelength plate 31, a polarization angle rotation element (a first polarization conversion element) 3, a birefringent element 4, a shutter element (a second polarization conversion element) 5, and a polarizer (polarization plate) 6 which are disposed in sequence from an incident side of light. The optical elements 3, 4, 5, and 6 may be configured as a layered structure or may be supported by a member formed of transparent glass or the like. The light from the color combination prism 18 is incident from the half-wavelength plate 31 and is emitted from the polarizer 6. The light from the polarizer 6 is incident on the projection lens 7 serving as a projection optical system.

The half-wavelength plate 31 is installed so that an optical axis (a phase advance axis or a phase delay axis) T of the half-wavelength plate 31 is inclined at 22.5° around a traveling direction (that is, an optical axis) of the light with respect to the polarization direction of the incident light (the S wave) to rotate the polarization direction of light 27 of the incident S wave by 45°. The light emitted from the half-wavelength plate 31 is polarized rightward at 45° with respect to the polarization direction of the incident light when viewed in a direction oriented toward the polarizer 6 from the half-wavelength plate 31 as in FIG. 4.

The polarization angle rotation element 3 converts light polarized rightward at 45° into light polarized leftward at 45° by rotating a polarization angle (polarization direction) of the incident light by 90° around the optical axis. To facilitate the following description, light polarized rightward at 45° is referred to as an R wave and light polarized leftward at 45° is referred to as an L wave. The conversion is performed based on an output voltage (an output signal) of the polarization control driver 8 whenever a display image in the liquid crystal display elements 17, 22, and 24 is updated. The polarization angle rotation element 3 can control polarization according to High/Low of a pulse signal output from the polarization control driver 8. In the embodiment, for example, a transmission-type liquid crystal panel configured using nematic liquid crystal or the like is used as an optical element that has such an optical rotation function.

The birefringent element 4 is an optical element formed of a substance (for example, a crystal) causing birefringence and shifts an optical path at the time of emission according to a polarization direction of the incident R wave or L wave. The birefringent element 4 is also an optical lowpass filter (OLPF). When G is a pixel pitch of the liquid crystal display elements 17, 22, and 24, the birefringent element 4 according to the embodiment is formed so that an inter-optical path shift amount in the R wave and the L wave is about ($\sqrt{2}/2$) G.

The shutter element 5 has a similar configuration as the polarization angle rotation element 3 and converts the R wave into the L wave (or the L wave into the R wave) by rotating a polarization angle of incident light by 90° around the optical axis according to an application voltage by the shutter control driver 9. The shutter element 5 can control polarization according to High/Low of a pulse signal output from the shutter control driver 9.

The polarizer 6 selects and emits only light in one polarization direction in light of two polarization directions set by the polarization angle rotation element 3 and discards light of the other polarization direction. The polarizer 6 may be of transmission type or reflection type. The polarizer 6 in the embodiment is, for example, a wire grid and is disposed so that only the R wave is passed and the L wave is blocked.

The projection lens 7 expands and projects the light from the polarizer 6 to the screen 114. The projection lens 7 may be configured using a known lens. Therefore, detailed description will be omitted.

As described above, the birefringent element 4 shifts optical paths for the R wave and the L wave. Accordingly, a pixel display position is switched for each sub-frame image. Here, a display position of a pixel on the screen 114 will be described with reference to FIG. 5. FIG. 5 schematically illustrates a display pixel position of one pixel. The horizontal direction of the screen 114 is an X direction and the vertical direction thereof is a Y direction. A pixel in the sub-frame image A is a pixel PA and a pixel in the sub-frame image B is a pixel PB. The pixels PA and PB are pixels that have the same pixel address. The position of the pixel PA is referred to as a first pixel display position and the position of the pixel PB is referred to as a second pixel display position.

The pixels PA and PB are shifted by Px/2 in the X direction. The pixels PA and PB are shifted by Py/2 in the Y direction. Px is a pixel pitch in the X direction and Py is a pixel pitch in the Y direction. Accordingly, the pixel that has the same pixel address is projected to the first pixel display position in the sub-frame image A and is projected to the second pixel display position in the sub-frame pixel B. Accordingly, a display position (projection position) of the sub-frame image A and a display position (projection position) of the sub-frame image B are shifted by a half of a pixel.

To perform such pixel shift display, the polarization control driver 8 and the shutter control driver 9 generate pulse signals. Specifically, the polarization control driver 8 controls the polarization angle rotation element 3 so that the L wave is incident on the birefringent element 4 in the sub-frame image A and the R wave is incident on the birefringent element 4 in the sub-frame image B. When the sub-frame images A and B are switched at 120 Hz, the polarization control driver 8 may supply the polarization angle rotation element 3 with a pulse signal of which High and Low are switched at 120 Hz.

Since the polarizer 6 passes the R wave, the shutter control driver 9 may control the shutter element 5 so that the R wave is incident on the polarizer 6 when the sub-frame images are displayed. Specifically, for the sub-frame image A in which light of the L wave is incident on the birefringent element 4, the shutter element 5 converts the light from the L wave to the R wave. For the sub-frame B in which light of the R wave is incident on the birefringent element 4, the shutter element 5 causes the light to remain as the R wave. When the sub-frame images A and B are switches at 120 Hz, the shutter control driver 9 may supply the shutter element 5 with a pulse signal of which High and Low are switched at 120 Hz.

Thus, each pixel is projected to the first pixel display position in the sub-frame image A and each pixel is projected to the second pixel display position in the sub-frame image B. That is, a projection position of a video on the screen 114 is switched at a predetermined period. At a timing at which the sub-frame images A and B are switched, a period in which the L wave is incident on the polarizer 6 may be provided. Thus, crosstalk can be suppressed.

The optical path changing unit 2 shifts the optical path of the light from the liquid crystal display element according to a control signal so that the projection position by the projection lens 7 is switched at a predetermined period. Thus, the pixel shift display can be performed on a video projected by the projection lens 7.

In the foregoing description, the optical path is changed using the birefringent element 4 to perform the pixel shift display. However, the optical path can also be changed using a piezoelectric actuator as in Patent Literature 1. Of course, the optical path may be changed for each sub-frame image according to another configuration.

<Generating Display Video Signal>

Further, in the embodiment, ON and OFF of the pixel shift display can be switched. At the time of turning on the pixel shift display, as described above, the optical path changing unit 2 changes an optical path for each sub-frame image. That is, the optical path changing unit 2 changes an optical path so that the first pixel display position and the second pixel display position are alternately switched. On the other hand, at the time of turning off the pixel shift display, the optical path changing unit 2 does not change the optical path. That is, the pixel display positions are normally the same position, for example, the normal first pixel display position.

Figure 6:
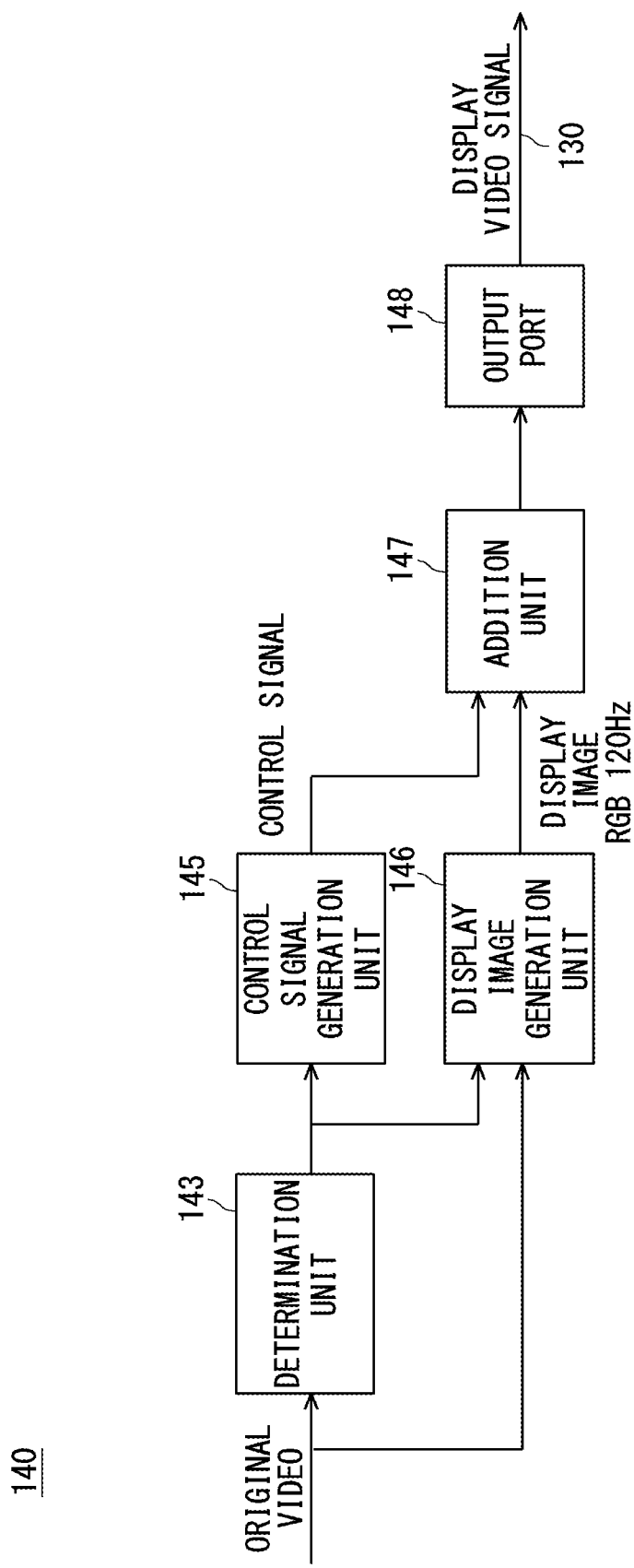
FIG. 6 is a block diagram illustrating a configuration of a video processing device generating a display video signal for performing the pixel shift display.

A configuration for generating a display video signal will be described with reference to FIG. 6. FIG. 6 is a block diagram illustrating a configuration of the video processing device 140. The video processing device 140 includes a determination unit 143, a control signal generation unit 145, a display image generation unit 146, an addition unit 147, and an output port 148.

An original video is input to the determination unit 143 and the display image generation unit 146. The original video is, for example, a CG video generated by the video processing device 140 or a camera video acquired by a camera. When the original video includes information regarding an image, a complete image may not be formed.

A resolution of the original video is higher than a display resolution of the liquid crystal display elements 17, 22, and 24. For example, the resolution of the original video is 8K and the display resolution of the liquid crystal display elements 17, 22, and 24 is 4K. A frame rate of the original video is, for example, 120 Hz. That is, a frame image of the original video is switched at each (1/120) sec. Of course, the frame rate is not limited to 120 Hz.

The determination unit 143 determines whether to perform the pixel shift display based on the original video. When a motion of the original video is slower than a threshold, the determination unit 143 turns on the pixel shift display. When the motion is faster than the threshold, the determination unit 143 turns off the pixel shift display. For example, the determination unit 143 compares two or more continuous frame images of the original video. Then, when a motion between the adjacent frame images is small, the determination unit 143 turns on the pixel shift display. Conversely, when the motion between the adjacent frame images is large, the determination unit 143 turns off the pixel shift display.

Then, the determination unit 143 outputs a determination signal indicating a determination result to the control signal generation unit 145 and the display image generation unit 146. The determination unit 143 may perform determination based on a motion of an entire frame image or may perform determination according to a partial motion of a frame image or a motion of a target included in a frame image. Alternatively, the determination unit 143 may perform determination according to a motion other than the motion of the original video.

The control signal generation unit 145 generates a control signal based on a determination result by the determination unit 143. The control signal includes an ON/OFF signal indicating ON/OFF of the pixel shift display and a High/Low signal indicating a pixel display position when the pixel shift display is turned on. The ON/OFF signal is 1-bit data. When a motion of the video is slow, the ON/OFF signal is a value indicating ON of the pixel shift display. When a motion of the video is fast, the ON/OFF signal is a value indicating OFF of the pixel shift display.

The High/Low signal is 1-bit data. For example, when the pixel display position is the first pixel display position, the High/Low signal is a first value. When the pixel display position is the second pixel display position, the High/Low signal is a second value. When the pixel shift display is turned on, the first and second values are alternately repeated at a given period in the High/Low signal. When the pixel shift display is turned off, the High/Low signal is the same normal value. In this way, the control signal generation unit 145 generates a control signal with a total of 2 bits. The control signal generation unit 145 outputs the generated control signal to the addition unit 147.

The display image generation unit 146 generates a display image from the original video based on a determination result by the determination unit 143. The display image corresponds to an image generated by the liquid crystal display elements 17, 22, and 24. Specifically, the display image is configured using pixel data (RGB data) of each display pixel of the liquid crystal display elements 17, 22, and 24. For example, when the video processing device 140 acquires information regarding the liquid crystal display elements 17, 22, and 24 via the interface unit 130, a display resolution or the like can be understood.

Figure 7:
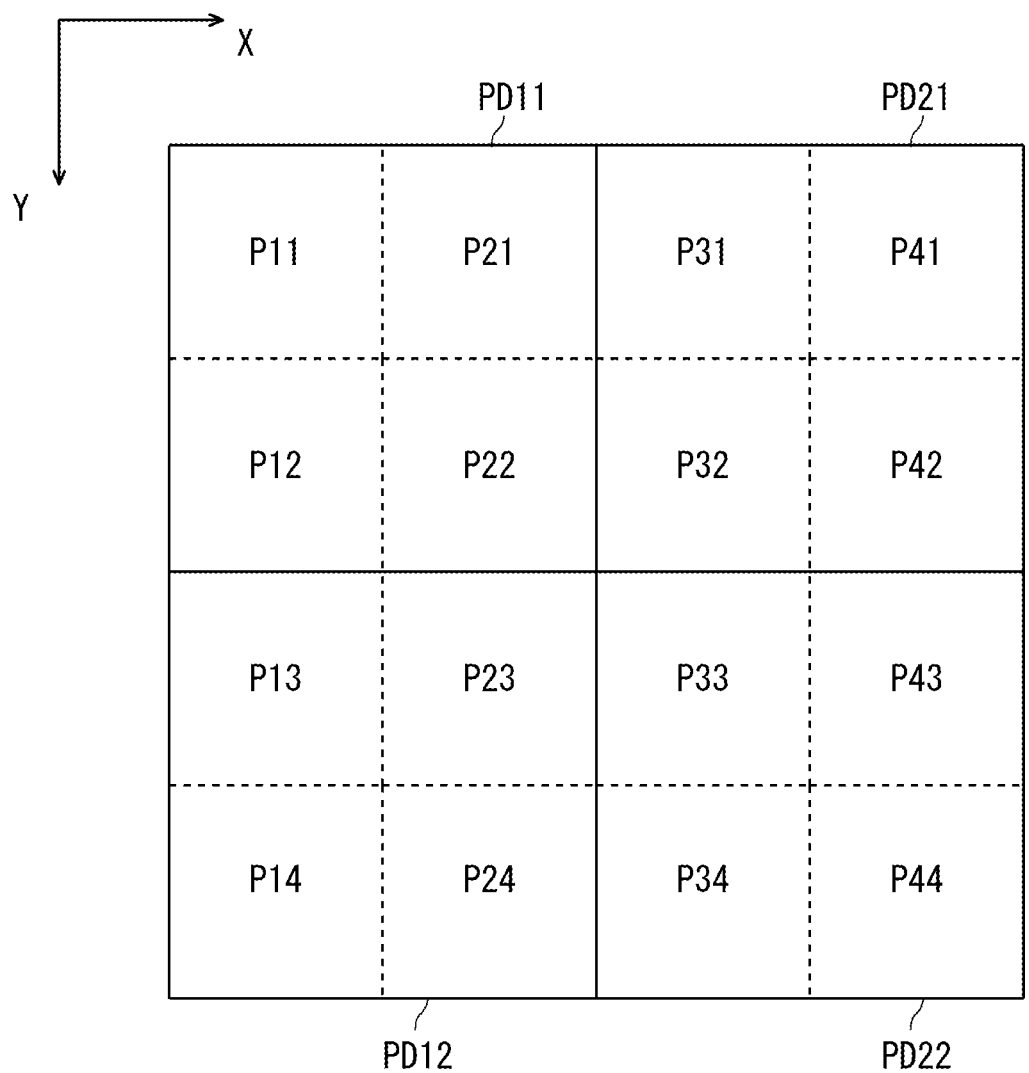
FIG. 7 is a diagram illustrating a sub-frame image generated from an original video.

When a motion of the original video is slow, the sub-frame images A and B are generated as display images from the original video. Here, a process of generating the sub-frame images A and B based on the original video will be described with reference to FIG. 7. FIG. 7 is a diagram illustrating pixels of the original video and display pixels in the liquid crystal display elements 17, 22, and 24. Hereinafter, only the liquid crystal display element 17 will be described as a representative of the liquid crystal display elements 17, 22, and 24.

In FIG. 7, 4×4 pixels in the original video are referred to as pixels P11 to P44. The pixels P11 to P44 correspond to 2×2 display pixels PD11 to PD22 of the liquid crystal display element 17. That is, four pixels of the original video correspond to one display pixel in the liquid crystal display element 17.

In the sub-frame image A, a gradation value of the pixel P11 of the original video is referred to as a gradation value of the display pixel PD11. Similarly, in the sub-frame image A, gradation values of the pixels P31, P13, and P33 of the original video are referred to as gradation values of the display pixels PD21, PD12, and PD22. In the sub-frame image B, gradation values of the pixels P22, P42, P24, and P44 are referred to as gradation values of the display pixels PD11, PD21, PD12, and PD22.

Accordingly, the pixels P11 and P22 are displayed using the same display pixel PD11. That is, during a display period of the sub-frame image A (hereinafter referred to as a first display period), the gradation value of the display pixel PD11 of the liquid crystal display element 17 is the gradation value of the pixel P11. During a display period of the sub-frame image B (hereinafter referred to as a second display period), the gradation pixel of the display pixel PD11 of the liquid crystal display element 17 is the gradation value of the pixel P22.

In this way, the two sub-frame images A and B can be generated from an image of one frame (original image) of the original video. That is, the gradation value of each pixel of the sub-frame images A and B can be determined from the gradation values of the original image. When the pixels of the original image and the number of bits of the gradation values of the liquid crystal display element are different, the sub-frame images A and B matched appropriately to the number of bits of the gradation values of the liquid crystal display element may be generated. In this way, when the pixel shift display is turned on, the display image generation unit 146 generates the sub-frame images A and B as display images from the original video. Of course, a method of generating the sub-frame images A and B is not limited to the foregoing method. For example, the display image generation unit 146 may generate the sub-frame images A and B based on the original image in which two or more frames of the original video continue.

When the pixel shift display is turned on, a video with a resolution higher than a resolution of the liquid crystal display element 17 can be displayed. Thus, it is possible to display a video with high display quality. A projected image of one frame is formed by the two sub-frame images A and B.

On the other hand, when the motion of the video is fast, the pixel shift display is turned off. In this case, the display image generation unit 146 generates the display images from the original video according to another method. The display image generation unit 146 generates the display images of one frame from an image of one frame of the original video. Based on the gradation values of four pixels P11, P12, P21, and P22 in FIG. 7, a gradation value of the display pixel PD11 can be generated. For example, the display image generation unit 146 sets an average value of the gradation values of the four pixels P11, P12, P21, and P22 to a gradation value of the display pixel PD11. Alternatively, the display image generation unit 146 sets a gradation value of one pixel among the four pixels P11, P12, P21, and P22 as a representative value to a gradation value of the display pixel PD11. In this way, the display images of one frame are generated from a frame image of one frame of the original video. When the video processing device 140 is an IG, the video processing device 140 can generate the original video with any resolution. Therefore, when the pixel shift display is turned off, the video processing device 140 may generate the original video with the same resolution as that of the display image.

In this way, according to ON/OFF of the pixel shift display, the display image generation unit 146 changes a scheme of generating a display video from the original video. One pixel of the display video is assumed to correspond to n (where n is an integer equal to or greater than 2: n=4 in FIG. 7) pixels of the original video. When the determination unit 143 determines that the pixel shift display is performed, the display image generation unit 146 generates the display images by using pixel data of a first pixel among n pixels in the display image in which a projection position is a first projection position and using pixel data of a second pixel among n pixels in the display image in which a projection position is a second projection position. When the determination unit 143 determines that the pixel shift display is not performed, the display image generation unit 146 generates the display images by using pixel data of one pixel among n pixels as a representative value or using an average value of the pixel data of the n pixels. Here, n is not limited to 4 and may be 2 or more.

In this way, the display image generation unit 146 generates the display images according to the resolution of the liquid crystal display element 17 based on the original video. The sub-frame images A and B when the pixel shift display is turned on are set as the display images. Then, a projected image of one frame is formed by the two sub-frame images A and B. A projected image of one frame is formed by the display images of one frame when the pixel shift display is turned off. Of course, the display image generation unit 146 may generate the display images based on two or more continuous frame images of the original video. The display image generation unit 146 outputs the generated display images to the addition unit 147.

The addition unit 147 adds the control signal to the display image. As described above, the control signal is 2-bit data. In the embodiment, the addition unit 147 adds the control signal to pixel data (RGB data) of the display image. For example, the addition unit 147 substitutes the first one pixel of the first line of the display image or a part of several pixels of the RGB data with the control signal. In this way, the addition unit 147 embeds the control signal which is a metadata in the display image. When the addition unit 147 embeds the control signal on a low-bit side of the RGB data, an influence on the projected image can be reduced. The addition unit 147 embeds the control signal in the same bit of the same normal pixel address.

The addition unit 147 is a display video signal generation unit that generates a display video signal by adding the control signal to the display image. That is, the addition unit 147 generates the display video signal in which the control signal is embedded as metadata in the RGB data. The display video signal generated by the addition unit 147 is transmitted to the interface unit 130 via the output port 148. The output port 148 is, for example, a DisplayPort.

In this way, the video processing device 140 generates a display video signal including the display image and the control signal. The display video signal includes pixel data (RGB data) of the display image. A frame rate of the display image is 120 Hz and matches a frame rate of the liquid crystal display element 17. The liquid crystal display element 17 switches between the display images for each ($\frac{1}{120}$) sec.

The RGB data of the display image is data indicating each gradation of the liquid crystal display elements 17, 22, and 24. The control signal includes the ON/OFF signal of the pixel shift display and the High/Low signal indicating polarity (a pixel display position) in the pixel shift display. The control signal is embedded in a part of the pixel data (the RGB data).

<Display in Projector 110>

Figure 8:
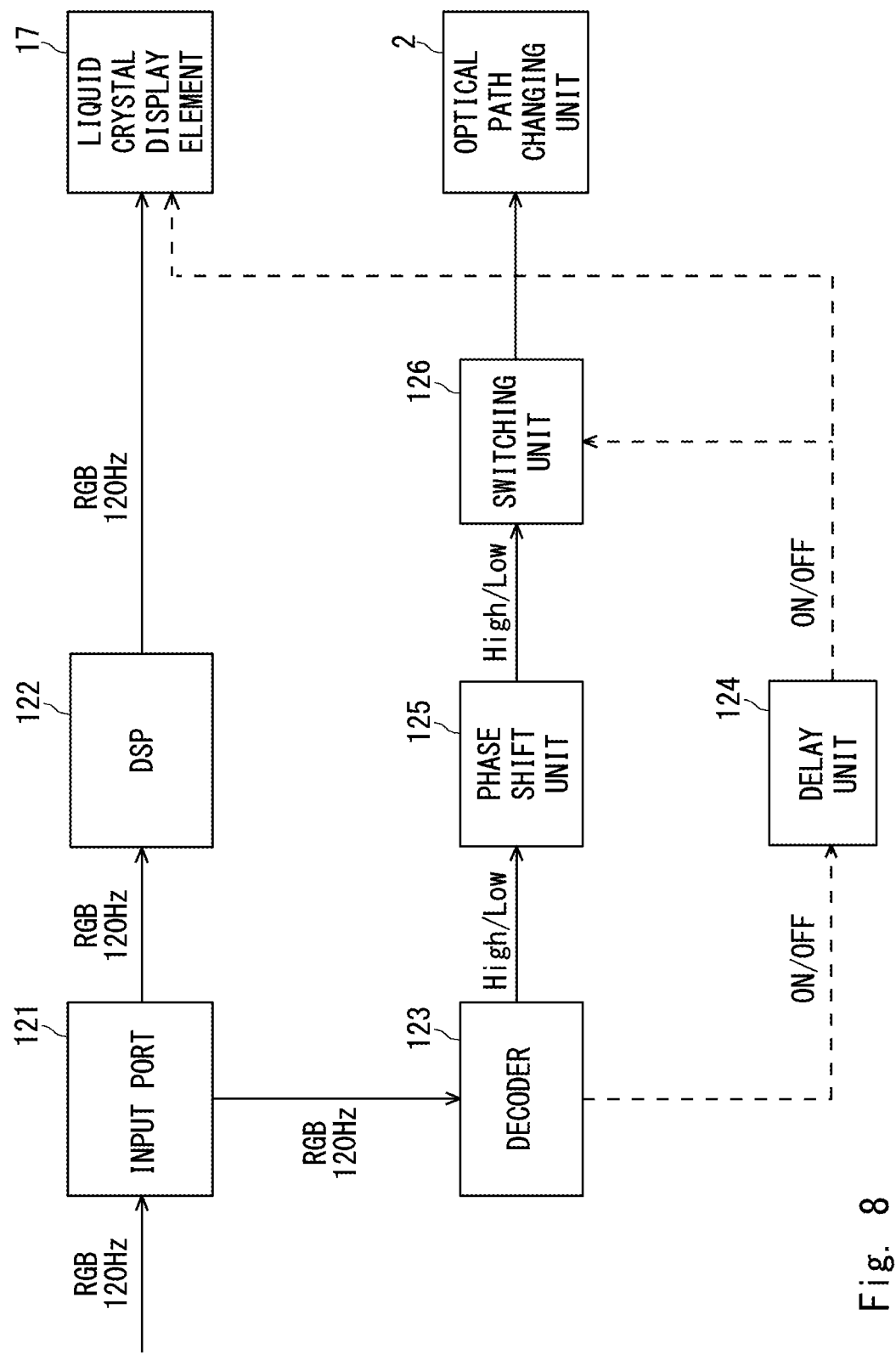
FIG. 8 is a block diagram illustrating a configuration for switching and displaying between ON and OFF of the pixel shift display.

Next, a process in the projector 110 will be described with reference to FIGS. 8 and 9. FIG. 8 is a control block diagram illustrating a configuration of the projection unit 111. FIG. 9 is a timing chart illustrating a process in the projector 110.

As illustrated in FIG. 8, the projection unit 111 includes an input port 121, a digital signal processor (DSP) 122, a decoder 123, a delay unit 124, a phase shift unit 125, and a switching unit 126.

The input port 121 is a DisplayPort. The display video signal from the video processing device 140 is input to the input port 121 via the interface unit 130. The display video signal from the input port 121 is input to the DSP 122 and the decoder 123. The DSP 122 generates a display driving signal of the liquid crystal display element 17 based on the display video signal. The display driving signal includes pixel data (RGB data) corresponding to a gradation value of each pixel.

The DSP 122 outputs the display driving signal to the liquid crystal display element 17. Then, the liquid crystal display element 17 generates a display image based on pixel data (B data) of the display element. For example, the liquid crystal display element 17 includes a display driver that drives a scanning line and a signal line based on the display driving signal. Accordingly, based on the pixel data of the display pixel, each pixel of the liquid crystal display element 17 realizes gradation display.

Since the liquid crystal display elements 22 and 24 perform a similar process as the process of the liquid crystal display element 17, the liquid crystal display elements 22 and 24 are omitted in FIG. 8. The liquid crystal display elements 22 and 24 perform gradation display based on G data and R data, respectively. The liquid crystal display elements 17, 22, and 24 modulate and emit light based on the pixel data (RGB data) of the display images included in the display video signal. Accordingly, the projection unit 111 can form a display image in which the RGB light is combined.

The decoder 123 decodes the display image to extract the control signal. As described above, the control signal is embedded in the same bit of the same pixel address. Accordingly, the decoder 123 can extract the control signal embedded in the display image. The decoder 123 outputs an ON/OFF signal to the delay unit 124 and outputs a High/Low signal to the phase shift unit 125.

The phase shift unit 125 shifts a phase of the High/Low signal and adjusts a timing of the High/Low signal for the display image. For example, according to a processing time in the DSP 122, the phase shift unit 125 shifts the phase of the High/Low signal by several clocks. Then, the phase shift unit 125 outputs the High/Low signal to the switching unit 126. The delay unit 124 adjusts the timings of the High/Low signal and the ON/OFF signal by delaying the ON/OFF signal by a predetermined time. The delay unit 124 outputs the ON/OFF signal to the switching unit 126 and the liquid crystal display element 17.

The switching unit 126 serves as a control unit that controls the optical path changing unit 2 based on the ON/OFF signal and the High/Low signal. The switching unit 126 switches between ON and OFF of the pixel shift display based on the ON/OFF signal. When the ON/OFF signal has a value indicating ON of the pixel shift display, the switching unit 126 controls the polarization control driver 8 and the shutter control driver 9 so that the optical path changing unit 2 switches the optical path at a period (120 Hz) corresponding to the sub-frame period. Thus, the sub-frame image A in which the display image is projected to the first display pixel position and the sub-frame image B in which the display image is projected to the second pixel display position are alternately switched.

When the ON/OFF signal has a value indicating OFF of the pixel shift display, the switching unit 126 controls the polarization control driver 8 and the shutter control driver 9 so that the optical path changing unit 2 does not switch the optical path. The polarization control driver 8 and the shutter control driver 9 supply a given voltage to each of the polarization angle rotation element 3 and the shutter element 5. Thus, the display images are projected to the same normal position.

Here, a display frame rate of the display image is 120 Hz which is the same between ON and OFF of the pixel shift display. That is, the liquid crystal display element 17 switches between the display images at 120 Hz. At the time of turning on the pixel shift display, the sub-frame image A and the sub-frame image B are alternately switched and displayed at 120 Hz.

At the time of turning on the pixel shift display, two sub-frame images A and B are generated as display images from one frame image of the original video. As illustrated in FIG. 9, the video processing device 140 generates sub-frame images A0 and B0 from a frame image of frame number 0 of the original video. Similarly, the video processing device 140 generates sub-frame images A1 and B1 from a frame image of frame number 1 of the original video. In the sub-frame images A0 and A1, the High/Low signal is at H. In the sub-frame images B0 and B1, the High/Low signal is at L.

At the time of turning off the pixel shift display, one display image is generated from one frame image of the original video. For example, in FIG. 9, the video processing device 140 generates the display image A0 from the frame image of frame number 0 of the original video. Further, the video processing device 140 generates display images A1 to A3 from the frame images of frame numbers 1 to 3 of the original video.

Accordingly, at the time of turning on the pixel shift display and the time of turning off the pixel shift display, the original video is displayed at different frame rates. In FIG. 9, a frame rate of the original video is denoted by Vsync_in. During a period in which four frame images of the original video are displayed at the time of turning off the pixel shift display, two frame images of the original video are displayed at the time of turning on the pixel shift display. Accordingly, at the time of turning off the pixel shift display, the original video can be displayed at a high frame rate.

In a scene in which a motion is fast, blurring of an image can be suppressed by displaying the video at a high frame rate. Therefore, the projection unit 111 turns off the pixel shift display. For example, when a target in the video is moving at a high speed, the video is displayed at a high frame rate. Thus, a motion of the target is displayed smoothly. On the other hand, in a scene in which a motion is slow, display delay does not occur even when the video is displayed at a low frame rate. Therefore, the projection unit 111 turns on the pixel shift display. Thus, in the scene in which the motion is slow, the image can be displayed with a high resolution. Thus, appropriate display can be performed according to a scene.

The switching unit 126 may switch between ON and OFF of the pixel shift display for each frame. In this way, display can be dynamically switched according to a motion of the video. Alternatively, the switching unit 126 may switch between ON and OFF of the pixel shift display for each scene.

Further, since the control signal is embedded in the pixel data, the projection unit 111 can easily perform the pixel shift display. For example, when the pixel shift display is performed under external control, it is necessary for a CPU or the like to intervene. Therefore, it is difficult to perform control in which the ON/OFF of the pixel shift display and a speed of a motion of the video are matched in units of frames. Thus, in the embodiment, since the control signal is embedded in the pixel data, the ON/OFF of the pixel shift display and the speed of the motion of the video can be matched in units of frames. That is, it is possible to easily adjust a timing of the display switching.

For the display image generated by the display image generation unit 146, a frame rate when the determination unit 143 determines that the pixel shift display is performed is twice a frame rate at the same projection position (the same image display position) when the determination unit determines that the pixel shift display is not performed. For example, when the pixel shift display is performed, the display image is alternately projected to the first pixel display position (the first projection position) and the second pixel display position (the second projection position). When the pixel shift display is not performed, the display image is projected to the first pixel display position. A frame rate at the first pixel display position (the first projection position) when the pixel shift display is not performed is twice a frame rate at the first pixel display position (the first projection position) when the pixel shift display is performed. The frame rate at the first pixel display position (the first projection position) is a frequency at which the display image is repeatedly projected to the first pixel display position (the first projection position). As described above, in the example in which the frame rate of the display image projected to the first image display position is 120 Hz when the pixel shift display is turned off, the frame rate of the display image projected to the first image display position is 60 Hz when the pixel shift display is turned on.

When the video processing device 140 is an IG that generates a CG video, a resolution and a frame rate of the video can be changed arbitrarily. The video processing device 140 can change the resolution and the frame rate of the video according to a motion of the video. The video processing device 140 can generate a video at a high frame rate and a low resolution in a scene in which a motion is fast, and can generate a video at a low frame rate and a high resolution in a scene in which a motion is slow. Since the video processing device 140 may not generate a video at a high frame rate and a high resolution, a processing load of the video processing device 140 can be reduced.

When the original video is a camera video, the video processing device 140 may generate a control signal according to performance (an imaging frame rate and an imaging resolution) of a camera. For example, the video processing device 140 generates a control signal so that the pixel shift display is turned on when a camera video is acquired at a resolution of 8K and a frame rate of 60 Hz, and the pixel shift display is turned off when a camera video is acquired at a resolution of 4K and a frame rate of 120 Hz. Thus, the camera video can be appropriately displayed.

The foregoing resolution or frame rate is a general example and is not limited to the following value. For example, in the projector 110 capable of performing display at 4K and 60P, the video processing device 140 generates a display image of 8K and 30P when the pixel shift display is turned on. The video processing device 140 generates a display image of 4K and 60P when the pixel shift display is turned off.

As a method of performing pseudo-gradation display using a plurality of frames, a frame rate control process (for example, see Japanese Unexamined Patent Application Publication No. 2012-93479 and Japanese Unexamined Patent Application Publication No. 2015-194596) or an error diffusion process (for example, see Japanese Unexamined Patent Application Publication No. 2015-87631) is effective.

In general, a frame rate control process is performed using a plurality of continuous frames as a set. However, a video signal when the pixel shift display is performed is a signal by which the sub-frames A and B are alternately repeated. Therefore, when the frame rate control process is performed on continuous (sub-) frames, a defect may occur. Accordingly, when the pixel shift display is performed, control is performed such that the frame rate control process is performed separately for each frame of the sub-frame A and each frame of the sub-frame B which are the same projection position. Specifically, when the ON/OFF signal input to the liquid crystal display element 17 is turned on (when the pixel shift display is performed), the frame rate control process is performed for every plurality of alternate frames. The ON/OF signal input to the liquid crystal display element 17 is turned off (when the pixel shift process is not performed), the frame rate control process is performed using a plurality of continuous frames as a set.

When the error diffusion process disclosed in Japanese Unexamined Patent Application Publication No. 2015-87631 is performed, control is performed such that the error diffusion process is similarly performed separately for each frame of the sub-frame A and each frame of the sub-frame B which are the same projection position when the pixel shift display is performed. Specifically, when the ON/OFF signal input to the liquid crystal display element 17 is turned on (when the pixel shift display is performed), the error diffusion process is performed for every plurality of alternate frames. The ON/OFF signal input to the liquid crystal display element 17 is turned off (when the pixel shift process is not performed), the error diffusion process is performed using a plurality of continuous frames as a set.

In the foregoing description, the example in which the first pixel display position and the second pixel display position are alternately repeated at the time of turning on the pixel shift display has been described, but the optical path changing unit 2 may sequentially switch three or more pixel display positions. For example, the optical path changing unit 2 may change the optical path so that four pixel display positions are sequentially switched. In this case, when the first pixel display position is a reference, the second pixel display position is shifted by 0.5 pixels in only the X direction, a third pixel display position is shifted by 0.5 pixels in only the Y direction, and a fourth pixel display position is shifted by 0.5 pixels in the X and Y directions.

Specifically, in FIG. 7, the first pixel display position corresponds to the pixel P11, the second pixel display position corresponds to the pixel P21, the third pixel display position corresponds to the pixel P12, and the fourth pixel display position corresponds to the pixel P22. In this way, when the video processing device 140 generates a display image, a resolution which is four times the resolution of the liquid crystal display element 17 can be obtained. In this case, for example, the video processing device 140 generates four sub-frame images of 4K from the original video of 8K. Accordingly, the projected image has the resolution of 8K.

The number of pixel display positions at the time of turning on the pixel shift display can also be changed step by step according to a speed of a motion of a video. For example, the video processing device 140 can divide a motion of a video into three steps and switch between OFF of the pixel shift display, the pixel shift display at two pixel display positions, and pixel shift display at four display pixel positions.

Specifically, the video processing device 140 sets two thresholds for a motion of a video. A first threshold is a value indicating that a motion of the video is faster than that of a second threshold. When a motion of the video is faster than that of the first threshold, the projection unit 111 turns off the pixel shift display. When a motion of the video is slower than that of the second threshold, the projection unit 111 switches four pixel display positions and performs the pixel shift display. When a motion of the video is between the first and second thresholds, the projection unit 111 switches two pixel display positions and performs the pixel shift display. In this case, a control signal indicating the pixel display positions is 2-bit data.

A frame rate of an original video can be changed step by step according to a motion of a video. Accordingly, display at a higher frame rate is possible in a video in which a motion is faster and a display at a lower frame rate is possible in a video in which a motion is slower. In this way, a processing load in the video processing device 140 can be reduced.

In the foregoing description, the control signal is used to switch between ON and OFF of the pixel shift display, but the control signal can also be used for other purposes. The video processing device 140 may generate the control signal in order to switch between two displays. Specifically, the video processing device 140 may generate a control signal for switching ON and OFF of 3D display. In this case, when the 3D display is turned on, the video processing device 140 alternately generates a left image and a right image as in the sub-frame images A and B. When the 3D display is turned off, the video processing device 140 generates a display image as in the time of turning off the pixel shift display. Thus, a 3-dimensional image can be displayed.

Alternatively, the video processing device 140 may generate a control signal for switching between ON and OFF of infrared image display. When the infrared image display is turned on, an infrared image and a visible image are alternately generated as in the sub-frame images A and B. When the infrared image display is turned off, the video processing device 140 generates a display image as in the time of turning off the pixel shift display. Thus, the infrared image and the visible image can be alternately displayed.

In the foregoing description, the pixel shift ON/OFF signal and the signal indicating the pixel display position in the case of the pixel shift ON have been described as different signals, but it is also realized an application in which these signals are used as one signal.

Some or all of the foregoing processes may be performed by a computer program. The above-described program is stored using various types of non-transitory computer readable medium to be supplied to a computer. The non-transitory computer readable medium includes various types of tangible storage media. Examples of the non-transitory computer readable medium include a magnetic recording medium (for example, a flexible disk, a magnetic tape, or a hard disk drive), a magneto-optical recording medium (for example, a magneto-optical disc), a CD-read-only memory (ROM), a CD-R, a CD-R/W, and a semiconductor memory (for example, a mask ROM or a programmable ROM (PROM), an erasable PROM (EPROM), and a flash ROM, and a random-access memory (RAM)). The program may be supplied to a computer by various types of transitory computer readable media. Examples of the transitory computer readable medium include an electrical signal, an optical signal, and an electromagnetic wave. A transitory computer readable medium can supply the program via a wired communication path such as an electrical wire or an optical fiber or a wireless communication path. When the processor 141 performs commands stored in the memory 142, the foregoing processes are performed.

While embodiments of the invention by the inventors have been described and illustrated above, it should be understood that the invention is not limited to the foregoing embodiments. Various modifications can be made within the scope of the present invention without departing from the gist of the present invention.

The present disclosure can be applied to a video processing device and a display system displaying an image.

What is claimed is:

1. A display system comprising:
a video processing device configured to generate a display video signal based on an original video; and
a pixel shift display device configured to perform pixel shift display based on the display video signal, wherein the video processing device includes
a determination unit configured to determine whether the pixel shift display is performed according to a motion between adjacent frame images of the original video,
a control signal generation unit configured to generate a control signal indicating ON/OFF of the pixel shift display and a pixel display position when the pixel shift display is turned ON, based on a determination result by the determination unit, the control signal including a first signal indicating ON/OFF of the pixel shift display and a second signal indicating a pixel display position when the pixel shift display is turned ON,
a display image generation unit configured to generate a display image from the original video, based on the determination result by the determination unit, a pixel data of a pixel of the display image being generated from pixel data of a plurality of pixels of the original video, and
an addition unit configured to generate the display video signal by replacing a part of first pixel of a first line of the display image with the control signal,
when the determination unit determines that the pixel shift display is not performed, the control signal generation unit generates the control signal so that the first control signal indicates OFF of the pixel shift display and the second signal is a constant value, and
when the determination unit determines that the pixel shift display is performed, the control signal generation unit generates the control signal so that the first signal indicates ON of the pixel shift display and a first value and a second value are alternatively repeated at a given period in the second signal, and the pixel shift display device includes
a spatial modulator configured to modulate and emit light based on pixel data of the display image included in the display video signal,
a projection optical system configured to project light from the spatial modulator,
an optical path changing unit configured to shift an optical path of light from the spatial modulator according to the control signal included in the display video signal so that a projection position by the projection optical system is switched at a predetermined period in order to perform the pixel shift display on a video to be projected by the projection optical system, and
a switching unit configured to switch between ON and OFF of the pixel shift display based on the control signal included in the first pixel of the first line of the display image included in the display video signal,
wherein the addition unit embeds the control signal on a lower-bit side of the pixel data of a same pixel of a same normal pixel,
wherein data of the original video in the lower-bit side of the pixel data in the same bit of a same normal pixel address is replaced, and wherein the optical path changing unit includes optical elements configured as a layered structure, such that the optical path changing unit includes a half-wavelength plate, a polarization angle rotation element, a birefringent element, a shutter element, and a polarizer disposed in sequence from an incident side of light.

2. The display system according to claim 1, wherein
when the motion between the adjacent frame images of the original video is greater than a threshold, the pixel shift display device performs display at OFF of the pixel shift display, and
when the motion between the adjacent frame images of the original video is smaller than the threshold, the pixel shift display device performs display at ON of the pixel shift display.

3. The display system according to claim 1, wherein when performing a process of pseudo-gradation display using a plurality of frames,
the spatial modulator performs a process using a plurality of continuous frames at OFF of the pixel shift display, and
the spatial modulator performs a process using a plurality of frames for each frame which is the same projection position at ON of the pixel shift display.

4. The display system according to claim 1, wherein
when the determination unit determines that the pixel shift display is not performed, the projection position is a first projection position,
when the determination unit determines that the pixel shift display is performed, the projection position is alternately switched between the first projection position and a second projection position, and
a frame rate at the first projection position when the pixel shift display is not performed is twice a frame rate at the first projection position when the pixel shift display is performed.

5. The display system according to claim 1, wherein
one display pixel of the display image corresponds to n (where n is an integer equal to or greater than 2) pixels of the original video,
when the determination unit determines that the pixel shift display is performed, the display image generation unit generates the display image using pixel data of a first pixel among the n pixels in a display image in which the projection position is the first projection position and using pixel data of a second pixel among then pixels in a display image in which the projection position is the second projection position, and
when the determination unit determines that the pixel shift display is not performed, the display image generation unit generates the display image using pixel data of one pixel among the n pixels as a representative value or using an average value of pixel data of the n pixels.

6. The display system according to claim 1, wherein the generating the display video signal includes embedding the control signal on a lower-bit side of the first pixel data of the first line of the display image, wherein pixel data of the original video at the lower-bit side of the first pixel data of the first line of the display image is deleted.

7. The display system according to claim 1, wherein the half-wavelength plate is arranged such that an optical axis of the half-wavelength plate is inclined at 22.5° around a traveling direction of the light with respect to a polarization direction of an incident light to rotate the polarization direction of light of an incident wave by 45°.

8. The display system according to claim 7, wherein the polarization angle rotation element converts light polarized rightward at 45° into light polarized leftward at 45° by rotating a polarization angle of the incident light by 90° around the optical axis.

9. The display system according to claim 8, wherein the birefringent element causes birefringence and shifts the optical path at a time of emission according to a polarization direction of an incident wave.

10. A pixel shift display device comprising:
a spatial modulator configured to modulate and emit light based on pixel data of a display image included in a display video signal;
a projection optical system configured to project light from the spatial modulator;
an optical path changing unit configured to shift an optical path of light from the spatial modulator according to a control signal included in first pixel of first line of the display image included in the display video signal so that a projection position by the projection optical system is switched at a predetermined period in order to perform the pixel shift display on a video to be projected by the projection optical system; and
a switching unit configured to switch between ON and OFF of the pixel shift display based on the control signal,
wherein the control signal including information indicating ON/OFF of the pixel shift display and information indicating a display position of the display image,
wherein the optical path changing unit shifts the optical path so that the display position is shifted by a half of the pixel,
wherein the display video signal is generated by embedding the control signal on a lower-bit side of the pixel data of a same pixel of a same normal pixel,
wherein data of an original video in the lower-bit side of the pixel data in the same bit of a same normal pixel address is replaced, and
wherein the optical path changing unit includes optical elements configured as a layered structure, such that the optical path changing unit includes a half-wavelength plate, a polarization angle rotation element, a birefringent element, a shutter element, and a polarizer disposed in sequence from an incident side of light.

11. A video processing method comprising:
a step of determining whether pixel shift display is performed according to a motion between adjacent frame images of to an original video;
a step of generating a control signal indicating ON/OFF of the pixel shift display and a pixel display position when the pixel shift display is turned ON, based on a determination result;
a step of generating a display image from the original video, based on the determination result, a pixel data of a pixel of the display image being generated from pixel data of a plurality of pixels of the original video; and
a step of generating a display video signal by replacing a part of first pixel of a first line of the display image with the control signal adding the control signal to the display image,
wherein the display video signal is generated by embedding the control signal on a lower-bit side of the pixel data of a same pixel of a same normal pixel, and
wherein data of the original video in the lower-bit side of the pixel data in the same bit of a same normal pixel address is replaced, and wherein an optical path changing unit shifts an optical path so that the pixel display position is shifted by a half of the pixel, the optical path changing unit comprising optical elements configured as a layered structure, such that the optical path changing unit includes a half-wavelength plate, a polarization angle rotation element, a birefringent element, a shutter element, and a polarizer disposed in sequence from an incident side of light.

12. A display method comprising:
a step of modulating and emitting light based on pixel data of a display image included in a display video signal by a spatial modulator;
a step of projecting light from the spatial modulator by a projection optical system;
a step of shifting an optical path of light from the spatial modulator according to a control signal included in first pixel of first line of the display image included in the display video signal so that a projection position by a projection optical system is switched at a predetermined period in order to perform pixel shift display on a video to be projected; and
a step of switching between ON and OFF of the pixel shift display, based on the control signal included in the display video signal,
wherein the control signal including information indicating ON/OFF of the pixel shift display and information indicating a display position of the display image,
wherein an optical path changing unit shifts the optical path so that the display position is shifted by a half of the pixel,
wherein the display video signal is generated by embedding the control signal on a lower-bit side of the pixel data of a same pixel of a same normal pixel,
wherein data of an original video in the lower-bit side of the pixel data in the same bit of a same normal pixel address is replaced, and wherein the optical path changing unit includes optical elements configured as a layered structure, such that the optical path changing unit includes a half-wavelength plate, a polarization angle rotation element, a birefringent element, a shutter element, and a polarizer disposed in sequence from an incident side of light.

13. A non-transitory computer readable medium storing a program causing a computer to perform:
a step of determining whether pixel shift display is performed according to a motion between adjacent frame images of an original video;
a step of generating a control signal indicating ON/OFF of the pixel shift display and a pixel display position when the pixel shift display is turned ON, based on a determination result;
a step of generating a display image from the original video, based on the determination result, a pixel data of a pixel of the display image being generated from pixel data of a plurality of pixels of the original video; and
a step of generating a display video signal by replacing a part of first pixel of a first line of the display image with the control signal,
wherein the display video signal is generated by embedding the control signal on a lower-bit side of the pixel data of a same pixel of a same normal pixel,
wherein data of the original video in the lower-bit side of the pixel data in the same bit of a same normal pixel address is replaced, and
wherein an optical path changing unit shifts an optical path so that the pixel display position is shifted by a half of the pixel, the optical path changing unit comprising optical elements configured as a layered structure, such that the optical path changing unit includes a half-wavelength plate, a polarization angle rotation element, a birefringent element, a shutter element, and a polarizer disposed in sequence from an incident side of light.

* * * * *